United States Patent
Zheng et al.

(10) Patent No.: US 10,868,343 B2
(45) Date of Patent: Dec. 15, 2020

(54) BATTERY CONTROL METHOD AND SYSTEM, SMART BATTERY, AND MOVABLE PLATFORM

(71) Applicant: SZ DJI TECHNOLOGY CO., LTD., Shenzhen (CN)

(72) Inventors: Dayang Zheng, Shenzhen (CN); Lei Wang, Shenzhen (CN); Wentao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 112 days.

(21) Appl. No.: 16/162,671

(22) Filed: Oct. 17, 2018

(65) Prior Publication Data

US 2019/0051950 A1 Feb. 14, 2019

Related U.S. Application Data

(63) Continuation of application No. PCT/CN2016/084116, filed on May 31, 2016.

(51) Int. Cl.
*H02J 7/00* (2006.01)
*H01M 10/44* (2006.01)
*H01M 10/48* (2006.01)

(52) U.S. Cl.
CPC ......... *H01M 10/44* (2013.01); *H01M 10/486* (2013.01); *H02J 7/0031* (2013.01); *H02J 7/00306* (2020.01)

(58) Field of Classification Search
CPC ........ H02J 7/0093; H02J 7/045; H02J 7/0031; H02J 7/00306; H01M 10/44; H01M 10/486; Y02E 60/12; Y02E 60/122
See application file for complete search history.

(56) References Cited

U.S. PATENT DOCUMENTS

| | | | | |
|---|---|---|---|---|
| 2003/0139859 A1* | 7/2003 | Hanada | ............... | F02N 11/0866 701/22 |
| 2003/0210017 A1* | 11/2003 | Tsujii | .................... | H02J 7/0016 320/166 |
| 2004/0004464 A1* | 1/2004 | Tsukamoto | ........... | H01M 10/44 320/162 |
| 2016/0254687 A1* | 9/2016 | Tanaka | .................. | H01M 10/48 320/112 |

FOREIGN PATENT DOCUMENTS

| CN | 102403767 A | 4/2012 |
|---|---|---|
| CN | 103125060 A | 5/2013 |
| CN | 104052112 A | 9/2014 |

OTHER PUBLICATIONS

The World Intellectual Property Organization (WIPO) International Search Report for PCT/CN2016/084116 dated Jan. 26, 2017 5 Pages.

* cited by examiner

*Primary Examiner* — Arun C Williams
(74) *Attorney, Agent, or Firm* — Anova Law Group, PLLC

(57) ABSTRACT

A method for controlling a battery includes obtaining a present status parameter of the battery, and determining a discharge protection parameter according to the present status parameter for using in a discharge protection operation on the battery.

16 Claims, 5 Drawing Sheets

BATTERY CONTROL METHOD AND SYSTEM, SMART BATTERY, AND MOVABLE PLATFORM

CROSS-REFERENCE TO RELATED APPLICATION

This application is a continuation application of International Application No. PCT/CN2016/084116, filed on May 31, 2016, the entire contents of which are incorporated herein by reference.

TECHNICAL FIELD

The present disclosure relates to the field of battery technology and, more particularly, to a battery control method, a battery control system based on the battery control method, a smart battery, and a movable platform.

BACKGROUND

Over discharge refers to that a battery continues to discharge for a long time duration after the discharge of the battery to a load is beyond a discharge cut-off voltage. The over discharge may cause an internal pressure of the battery to rise, and thus cause reversibility of active materials at positive and negative terminals of the battery to be damaged, and cause a battery capacity to decrease. In conventional technologies, the industry usually adopts a discharge cut-off voltage under a normal load and a longest sustainable discharge time duration of the battery under the discharge cut-off voltage as a determination basis of the voltage protection. However, the discharge cut-off voltage of the battery under different operation statuses or different discharge conditions varies. In conventional technologies, only the fixed discharge protection parameter is used as the determination basis for discharge protection. Thus, it is difficult to relatively accurately perform discharge protection. That is, conventional technologies cannot choose a corresponding determination basis for the discharge protection according to a present operation status of the battery, and thus it is difficult to relatively accurately perform discharge protection on the battery, thereby making it difficult to utilize the battery capacity to a greater degree.

SUMMARY

In accordance with the disclosure, there is provided a method for controlling a battery. The method includes obtaining a present status parameter of the battery, and determining a discharge protection parameter according to the present status parameter for using in a discharge protection operation on the battery.

Also in accordance with the disclosure, there is provided a system for controlling a battery. The system includes a processor configured to obtain a present status parameter of the battery, and determine a discharge protection parameter according to the present status parameter for using in a discharge protection operation on the battery.

Also in accordance with the disclosure, there is provided a smart battery including a control circuit and one or more energy storage units electrically coupled to the control circuit. The one or more energy storage units are configured to provide electricity through the control circuit. The control circuit is configured to determine a discharge protection parameter according to a present status parameter of the one or more energy storage units, and perform a discharge protection operation on the one or more energy storage units according to the discharge protection parameter.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

Figure 1:
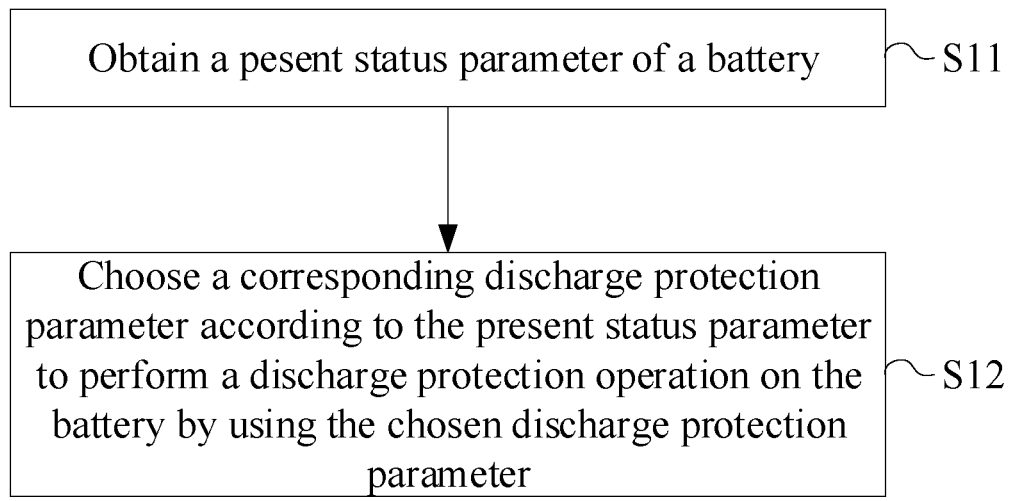
FIG. 1 illustrates a flow chart of an exemplary battery control method consistent with various disclosed embodiments of the present disclosure.

FIG. 1 illustrates a flow chart of an exemplary battery discharge protection method consistent with various disclosed embodiments of the present disclosure. As shown in FIG. 1, the method includes processes S11 and S12.

At S11, a present status parameter of a battery is obtained.

In some embodiments, the present status parameter of the battery may include at least one index parameter of the battery at a present operation status, e.g., a status that the battery is presently discharging to a load. The status parameter may include, but is not limited to, at least one of a discharge electrical current, a temperature, an internal resistance, the number of times of discharge, or a State of Health (SOH) of a battery core of the battery, when the battery is at a discharge status.

A discharge protection parameter may serve as a judgement basis for discharge protection of the battery, including, but not limited to, a discharge cut-off voltage and/or a longest sustainable time duration for the battery being discharged at the discharge cut-off voltage.

At S12, a corresponding discharge protection parameter is chosen according to the present status parameter and is used to perform a discharge protection operation for the battery. Status parameters within different ranges may correspond to different discharge protection parameters.

In some embodiments, a corresponding discharge protection parameter is chosen according to a present status parameter. That is, the determination basis for the discharge protection may be dynamically adjusted according to the change of the operation status. For example, the status parameter may include a discharge electrical current and a temperature of the battery at a discharge status, and the discharge protection parameter may include a discharge cut-off voltage and a longest sustainable time duration for the battery being discharged at the discharge cut-off voltage. For example, as shown in Table 1 below, the operation status of the battery can include any combination of one of I<15 A, 15 A<I<25 A, or I>25 A and one of T<5° C., 5° C.≤T<15° C., or T>15° C., where I denotes the discharge electrical current and T denotes the temperature. When the present operation status of the battery is one of I<15 A and T<5° C. (i.e., a combination of I<15 A and T<5° C.), 15 A<I<25 A and T<5° C., I>25 A and T<5° C., I>25 A and 5° C.≤T<15° C., or I>25 A and T>15° C., the chosen discharge protection parameter is P1. That is, the discharge cut-off voltage is approximately 2.8V, and the longest sustainable time duration is approximately 15 s. When the present operation status of the battery is one of I<15 A and 5° ° C.≤T<15° C., 5° C.≤T<15° C. and 15 A<I<25 A, or 15 A<I<25 A and T>15°, the chosen discharge protection parameter is P2. That is, the discharge cut-off voltage is approximately 3.0V and the longest sustainable time duration is approximately 10 s. When the present operation status of the battery is I<15 A and T>15° C., the chosen discharge protection parameter is P3. That is, the discharge cut-off voltage is approximately 3.2V, and the long sustainable time duration is approximately 5 s.

TABLE 1

| Preset Condition | T < 5° C. | 5° C. ≤ T < 15° C. | T > 15° C. |
| --- | --- | --- | --- |
| I < 15A | P1 | P2 | P3 |
| 15A < I < 25A | P1 | P2 | P2 |
| I > 25A | P1 | P1 | P1 |

In some other embodiments, other values may be assigned to the above-described status parameter and discharge protection parameter. In some embodiments, when the discharge electrical current is greater than a preset current threshold, the discharge protection parameter may be a constant. When the discharge electrical current is less than a preset current threshold, the discharge protection parameter may change according to the change of the battery temperature. When the battery temperature is less than a preset temperature, the discharge protection parameter may be a constant. When the battery temperature is greater than a preset temperature, the discharge protection parameter may change according to the change of the discharge electrical current of the battery. Further, the longest sustainable time duration may be inversely proportional to the discharge cut-off voltage.

Table 1 above may be equivalent to a mapping relationship, and include a correspondence between different status parameter ranges and different discharge protection parameters. That is, the discharge protection parameter may be chosen according to the present status parameter of the battery and the preset mapping relationship. In some other embodiments, a corresponding discharge protection parameter may be obtained by comparing magnitudes and making judgement according to the present status parameter. For example, the status parameter may include I<15 A and T<5° C., or I<15 A and 5° C.≤T<15° C., and the discharge protection parameter may include a discharge cut-off voltage of approximately 2.8V and a longest sustainable time duration of approximately 15 s, or a discharge cut-off voltage of approximately 3.0V and a longest sustainable time duration of approximately 10 s. Since the discharge electrical currents both are less than a preset current threshold of approximately 15 A, the discharge cut-off voltage may decrease as the temperature of the battery increases. When the present status parameter is I<15 A and T<5° C., the chosen discharge protection parameter may include a discharge cut-off voltage of approximately 2.8V and a longest sustainable time duration of approximately 15 s. When the present status parameter is I<15 A and 5° C.≤T<15° C., the chosen discharge protection parameter may include a discharge cut-off voltage of approximately 3.0V and a longest sustainable time duration of approximately 10 s.

In some embodiments, a determination basis of the discharge protection may be chosen according to a present operation status of the battery, instead of using only the discharge protection parameter under one operation status as the determination basis, such that a discharge protection may be performed on the battery relatively accurately according to the operation status. For example, under voltage protection (UVP) may be performed on the battery to disconnect the discharge circuit of the battery for the load, so as to utilize the battery capacity to a greater extent.

Figure 2:
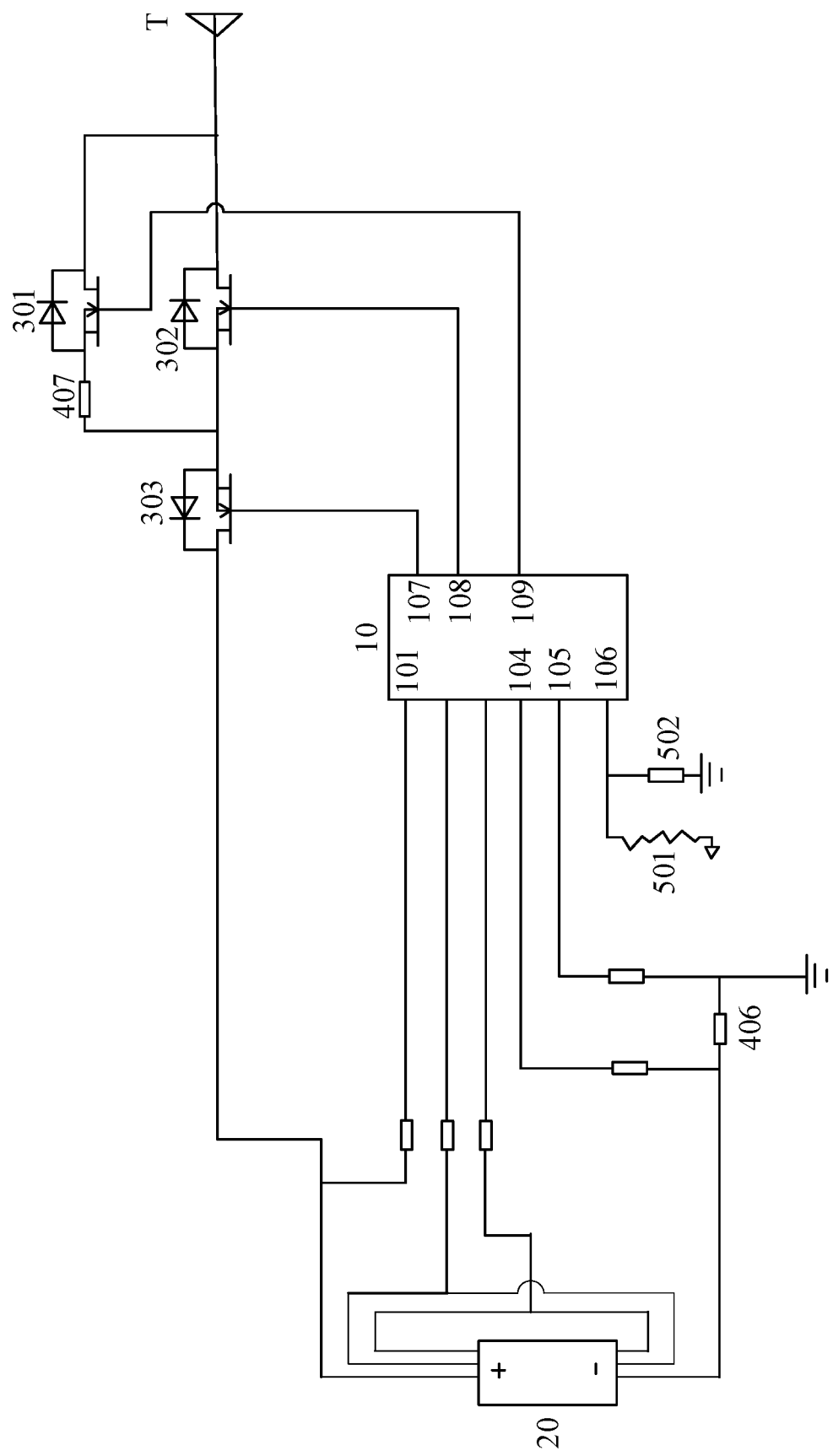
FIG. 2 is a circuit diagram of an exemplary device for detecting a discharge electrical current and a temperature of a battery consistent with various disclosed embodiments of the present disclosure.

In some embodiments, the present status parameter of the battery may need to be detected. FIG. 2 shows an example device consistent with the disclosure. The operation and process of detecting the present discharge electrical current and temperature of the battery are described below with in connection with the device shown in FIG. 2.

Referring to FIG. 2, the device includes an electrical current transmission terminal T, a protection circuit, a control chip 10, and an electrical current limiting resistor 407.

The electrical current transmission terminal A can be connected to a load in a pluggable connection. The battery 20 can include, but is not limited to, a single lithium battery or a plurality of batteries in series. The control chip 10 includes a first analog-to-digital conversion terminal 101 connected to a positive electrode and a negative electrode of the battery 20.

The protection circuit includes a first p-channel metal-oxide-semiconductor (PMOS) transistor 301, a second PMOS transistor 302, and a third PMOS transistor 303. A drain electrode of the first PMOS transistor 301 is electrically coupled to the electrical current transmission terminal T. A gate electrode of the first PMOS transistor 301 is electrically coupled to a first control voltage output terminal 109 of the control chip 10. A drain electrode of the second PMOS transistor 302 is electrically coupled to the electrical current transmission terminal T. A gate electrode of the second PMOS transistor 302 is electrically coupled to a control voltage output terminal 108 of the control chip 10. A drain electrode of the third PMOS transistor 303 is electrically coupled to a positive electrode of the battery 20. A gate electrode of the third PMOS transistor 303 is electrically coupled to a control voltage output terminal 107 of the control chip 10. A source electrode of the third PMOS transistor 303 is electrically coupled to a source electrode of the second PMOS transistor 302. The electrical current limiting resistor 407 is arranged between the source electrode of the third PMOS transistor 303 and the source electrode of the first PMOS transistor 301.

The device further includes a detection circuit. The detection circuit includes an electrical current detection resistor 406. One terminal of the electrical current detection resistor 406 is electrically coupled to a second analog-to-digital conversion terminal 104 of the control chip 10 and the positive electrode of the battery 20. Another terminal of the electrical current detection resistor 406 is electrically coupled to a third analog-to-digital conversion terminal 105 of the control chip 10 and a ground terminal.

In some embodiments, the control chip 10 obtains a first voltage from the second analog-to-digital conversion terminal 104, and obtains a second voltage from the third analog-to-digital conversion terminal 105, and obtains a discharge electrical current, i.e., a discharge electrical current value of the battery 20, according to the equation $I=(V1-V2)/R$, where I denotes the discharge electrical current, V1 denotes the first voltage, V2 denotes the second voltage, and R denotes a resistance value of the electrical current detection resistor 406.

As shown in FIG. 2, the device further includes a thermistor 501. The thermistor 501 can be arranged at an outer surface of the battery 20. One terminal of the thermistor 501 is electrically coupled to a constant voltage source, and another terminal of the thermistor 501 is electrically coupled to a fourth analog-to-digital conversion terminal 106 of the chip 10. The control chip 10 can obtain a voltage value of the thermistor 501 through the fourth analog-to-digital conversion terminal 106, and obtain a temperature value of the outer surface of the battery 20 according to the voltage value of the thermistor 501.

Figure 3:
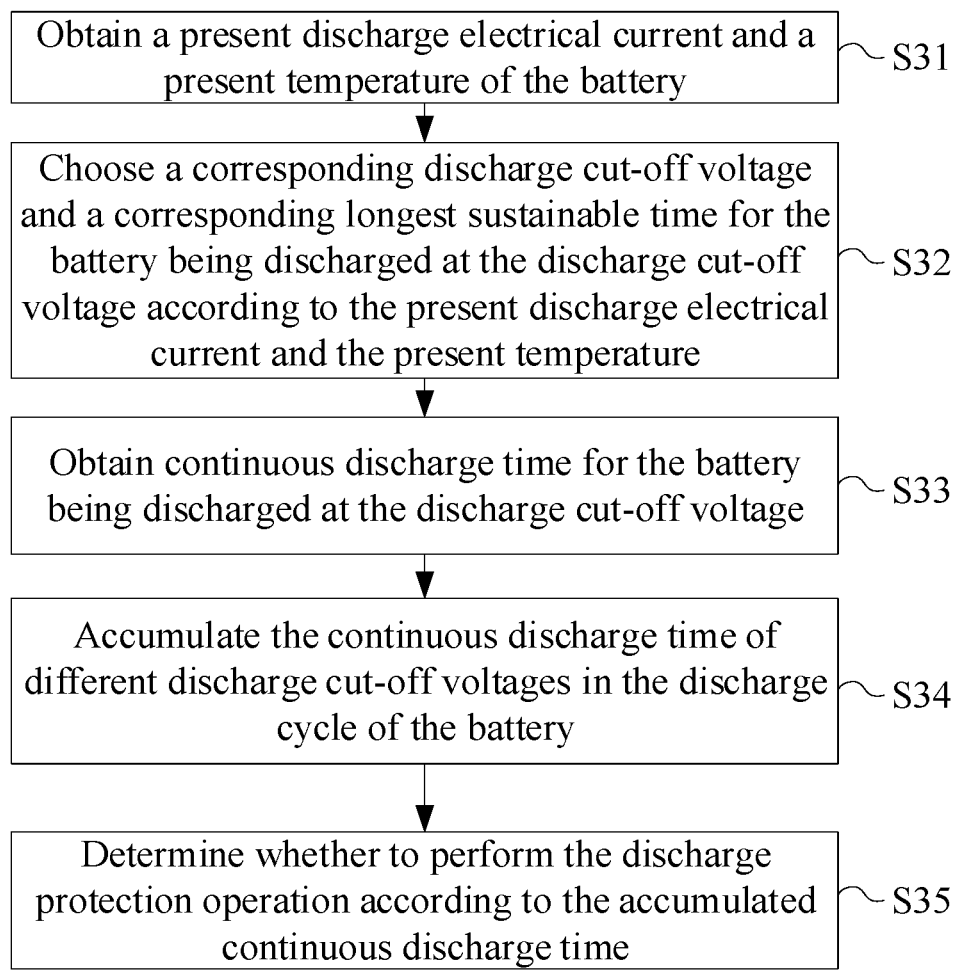
FIG. 3 illustrates a flow chart of another exemplary battery control method consistent with various disclosed embodiments of the present disclosure.

FIG. 3 is a flow chart of an example battery control method consistent with the disclosure. According to the battery control method shown in FIG. 3, discharge protection when the operation status of the battery changes is performed with consideration of continuous discharge time duration under different discharge cut-off voltages.

In the example described below in connection with FIG. 3, the status parameter includes a discharge electrical current and a temperature of the battery at a discharge status, and the discharge protection parameter includes a discharge cut-off voltage and a longest sustainable time duration for the battery being discharged at the discharge cut-off voltage.

Referring to FIG. 3, the method includes one or more of processes S31 to S35.

At S31, a present discharge electrical current and a present temperature of the battery are obtained.

At S32, a corresponding discharge cut-off voltage and a corresponding longest sustainable time duration for the battery being discharged at the discharge cut-off voltage are chosen according to the present discharge electrical current and the present temperature.

At S33, continuous discharge time duration for the battery being discharged at the discharge cut-off voltage is obtained.

At S34, the continuous discharge time durations of different discharge cut-off voltages in the discharge cycle of the battery is accumulated.

At S35, it is determined whether to perform the discharge protection operation according to the accumulated continuous discharge time duration.

The continuous discharge time durations of different discharge cut-off voltages is accumulated, i.e., added up, which is equivalent to an accumulation of battery capacity loss at different operation statuses. A discharge protection operation is performed on the battery when the cumulative sum of the battery capacity loss in the operation statuses reaches a maximum battery capacity.

As the discharge cut-off voltages of the battery at different operation statuses may be different, levels of the battery capacity loss caused in the continuous discharge time durations at different operation statuses are inconsistent. Thus, the continuous discharge time durations corresponding to different discharge cut-off voltages may need to be modified. In some embodiments, a modification factor corresponding to a discharge cut-off voltage may be used for modifying the continuous discharge time duration corresponding to the discharge cut-off voltage. Further, the modified continuous discharge time duration may be accumulated. In some embodiments, different discharge cut-off voltages correspond to different modification factors, different discharge cut-off voltages and different modification factors can have a mapping relationship, and a modification factor corresponding to a discharge cut-off voltage can be chosen according to the mapping relationship.

In some embodiments, the modification factor for a longest sustainable time duration corresponding to a discharge cut-off voltage may include a quotient of a common multiple of the longest sustainable time durations over the longest sustainable time duration corresponding to the discharge cut-off voltage.

Figure 4:
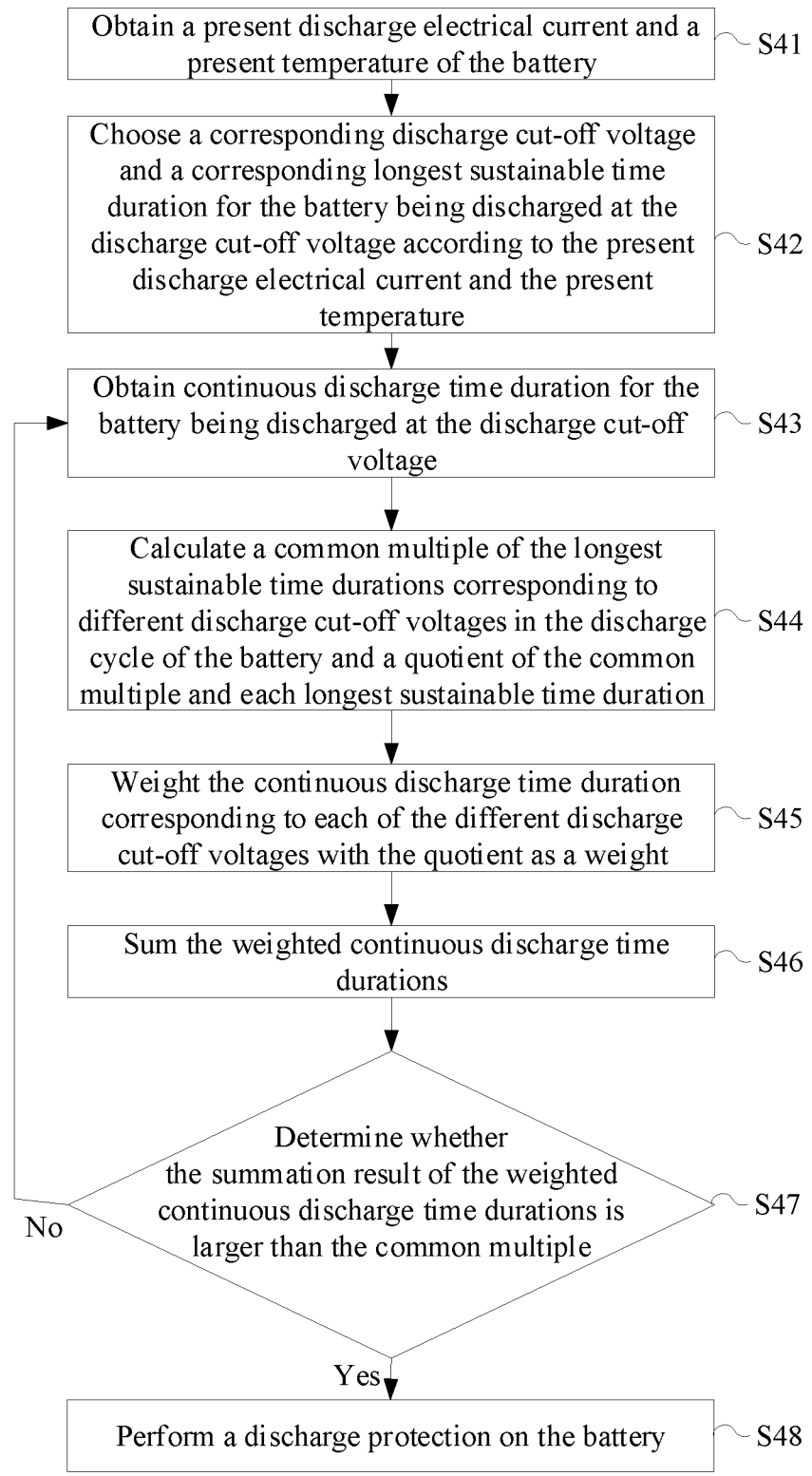
FIG. 4 illustrates a flow chart of another exemplary battery control method consistent with various disclosed embodiments of the present disclosure.

As shown in FIG. 4, in some embodiments, the battery control method includes one or more of processes S41 to S48.

At S41, a present discharge electrical current and a present temperature of the battery are obtained.

At S42, a corresponding discharge cut-off voltage and a corresponding longest sustainable time duration for the battery being discharged at the discharge cut-off voltage are chosen according to the present discharge electrical current and the present temperature.

At S43, continuous discharge time durations for the battery being discharged at the discharge cut-off voltage is obtained.

At S44, a common multiple of the longest sustainable time durations corresponding to different discharge cut-off voltages in the discharge cycle of the battery, and a quotient of the common multiple and each longest sustainable time duration are calculated.

At S45, the continuous discharge time duration corresponding to each of the different discharge cut-off voltages is weighted with the quotient as a weight.

At S46, the weighted continuous discharge time durations are summed.

At S47, a summation result of the weighted continuous discharge time durations is compared with the common multiple to determine whether the summation result of the weighted continuous discharge time durations is larger than the common multiple.

If the summation result is larger than the common multiple (S47: Yes), S48 is performed. If the summation result is not larger than the common multiple (S47: No), the process returns to S43. In some embodiments, S43-S47 are repeatedly performed until the summation result becomes larger than the common multiple, and then S48 is performed.

At S48, a discharge protection is performed on the battery.

In some embodiments, a weight for each longest sustainable time duration, i.e., a weight for each discharge protection parameter, may be obtained according to the relation $m=n*t$, where m denotes a least common multiple of all of the longest sustainable time durations, n denotes the weight, and t denotes a longest sustainable time duration. The weighting process is described below using the settings listed in Table 1 as examples. In the example shown in Table 1 and described in corresponding text, the least common multiple of the three longest sustainable time durations is 30 s, and the weights for discharge protection parameters P1, P2, and P3 are 2 (=30 s/15 s), 3 (=30 s/10 s), and 6 (=30 s/5 s), respectively. In response to the present status parameter of the battery being determined as one of I<15 A and T<5° C., 15 A<I<25 A and T<5° C., I>25 A and T<5° C., I>25 A and 5° C.≤T<15° C., or I>25 A and T>15° C., the battery is discharged at a discharge cut-off voltage of approximately 2.8V, i.e., the discharge cut-off voltage in discharge protection parameter P1, which has a weight of 2 as discussed above. Under this discharge condition, the weighted continuous discharge time duration is twice the actual continuous discharge time duration, i.e., every second of actual continuous discharge time duration can be converted to two seconds of weighted continuous discharge time duration. In response to the present status parameter of the battery being determined as one of I<15 A and 5° C.≤T<15° C., 5° C.≤T<15° C. and 15 A<I<25 A, or 15 A<I<25 A and T>15° C., the battery is discharged at a discharge cut-off voltage of approximately 3.0V, i.e., the discharge cut-off voltage in discharge protection parameter P2, which has a weight of 3 as discussed above. Under this discharge condition, the weighted continuous discharge time duration is three times the actual continuous discharge time duration, i.e., every second of actual continuous discharge time duration can be converted to three seconds of weighted continuous discharge time duration. In response to the present status parameter of the battery being determined as I<15 A and T>15° C., the battery is discharged at a discharge cut-off voltage of approximately 3.2V, i.e., the discharge cut-off voltage in discharge protection parameter P3, which has a weight of 6 as discussed above. Under this discharge condition, the weighted continuous discharge time duration is six times the actual continuous discharge time duration, i.e., every second of actual continuous discharge time duration can be converted to six seconds of weighted continuous discharge time duration. Further, when it is determined that a sum of the weighted continuous discharge time duration(s) is greater than or equal to 30 s, a discharge protection is performed on the battery.

Figure 5:
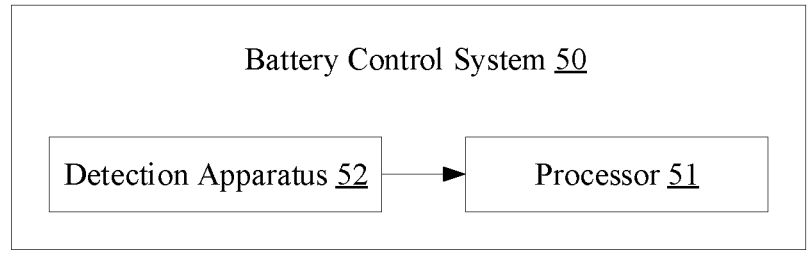
FIG. 5 is a block diagram of an exemplary battery control system consistent with various disclosed embodiments of the present disclosure.

The present disclosure provides a battery control system, such as a battery control system 50 shown in FIG. 5. As shown in FIG. 5, the battery control system 50 includes a processor 51. The processor 51 is configured to obtain a present status parameter of a battery; and to choose a corresponding discharge protection parameter according to the present status parameter to perform a discharge protection operation for the battery. In some embodiments, status parameters within different ranges may correspond to different discharge protection parameters.

In some embodiments, the battery control system 50 further includes a detection apparatus 52 coupled to the processor 51. The detection device 52 is configured to detect the present status parameter of the battery and transmit the present status parameter to the processor 51.

In some embodiments, the status parameter may include at least one of a discharge electrical current, a temperature, an internal resistance, the number of times of discharge, or SOH of a battery core of the battery.

In some embodiments, the discharge protection parameter may include at least one of a discharge cut-off voltage or a longest sustainable time duration for the battery being discharged at the discharge cut-off voltage. In some embodiments, the longest sustainable time duration may be inversely proportional to the discharge cut-off voltage.

In some embodiments, the processor 51 is further configured to obtain the continuous discharge time duration for the battery being discharged at the discharge cut-off voltage, and to accumulate the continuous discharge time duration of different discharge cut-off voltages within the discharge cycle of the battery, and to determine whether to perform a discharge protection operation according to the accumulated continuous discharge time duration. In some embodiments, the approach to accumulate the continuous discharge time duration of different discharge cut-off voltages may include that the processor 51 modifies the continuous discharge time duration corresponding to each of different discharge cut-off voltages by using a modification factor corresponding to the discharge cut-off voltage, where different discharge cut-off voltages correspond to different modification factors; and accumulates the modified continuous discharge time durations.

In some embodiments, the modification factor for a longest sustainable time duration corresponding to a discharge cut-off voltage may include a quotient of a common multiple of the longest sustainable time durations corresponding to different discharge cut-off voltages over the longest sustainable time duration corresponding to the discharge cut-off voltage. Correspondingly, the processor 51 may be further configured to calculate the common multiple of the longest sustainable time durations corresponding to different discharge cut-off voltages and the quotient; to use the quotient as a weight to weight the continuous discharge time duration corresponding to each of different discharge cut-off voltages; to sum the weighted continuous discharge time durations; to compare a summation result of the weighted continuous discharge time durations with the common multiple; and to perform a discharge protection on the battery in response to the summation result being larger than the common multiple. In response to the summation result being not larger than the common multiple, the processor 51 may continue to obtain the continuous discharge time duration of the battery being discharged at the discharge cut-off voltage until the summation result exceeds the common multiple and then the discharge protection can be performed on the battery.

Figure 6:
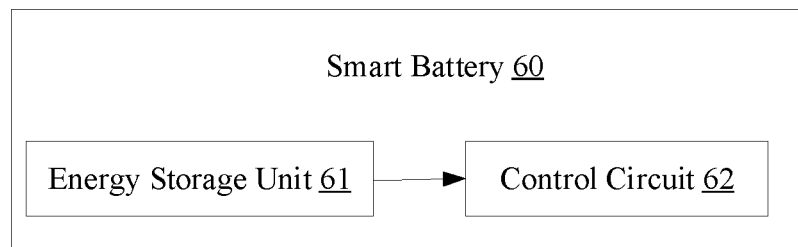
FIG. 6 is a block diagram of an exemplary smart battery consistent with various disclosed embodiments of the present disclosure.

The present disclosure provides a smart battery, such as a smart battery 60 shown in FIG. 6. As shown in FIG. 6, the smart battery includes one or more energy storage units 61 (only one of the energy storage units 61 being shown in FIG. 6) and a control circuit 62. The energy storage unit 61 is used to store electrical energy. The control circuit 62 is electrically coupled to the energy storage unit 61. The energy storage unit 61 provides power to external objects through the control circuit 62. The control circuit 62 is configured to choose a corresponding discharge protection parameter according to a present status parameter of the energy storage unit 61 to perform discharge protection operation on the battery using the chosen discharge protection parameter. In some embodiments, different status parameter ranges correspond to different discharge protection parameters.

In some embodiments, the energy storage unit 61 may include a battery core.

In some embodiments, the status parameter may include at least one of a discharge electrical current, a temperature, an internal resistance, the number of times of discharge, or SOH of the battery core of the battery.

In some embodiments, the discharge protection parameter may include at least one of a discharge cut-off voltage or a longest sustainable time duration for the battery being discharged at the discharge cut-off voltage. In some embodiments, the longest sustainable time duration may be inversely proportional to the discharge cut-off voltage.

In some embodiments, the control circuit 62 is further configured to obtain the continuous discharge time duration for the battery being discharged at the discharge cut-off voltage, and to accumulate the continuous discharge time durations of different discharge cut-off voltages within the discharge cycle of the battery, and to determine whether to perform a discharge protection operation according to the accumulated continuous discharge time duration. In some embodiments, the approach to accumulate the continuous discharge time durations of different discharge cut-off voltages may include that the control circuit 62 modifies the continuous discharge time duration corresponding to each of different discharge cut-off voltages by using a modification factor corresponding to the discharge cut-off voltage, where different discharge cut-off voltages correspond to different modification factors; and accumulates the modified continuous discharge time durations.

In some embodiments, the modification factor for a longest sustainable time duration corresponding to a discharge cut-off voltage may include a quotient of a common multiple of the longest sustainable time durations corresponding to different discharge cut-off voltages over the longest sustainable time duration corresponding to the discharge cut-off voltage. Correspondingly, the control circuit 62 may be further configured to calculate the common multiple of the longest sustainable time durations corresponding to different discharge cut-off voltages and the quotient; to use the quotient as a weight to weight the continuous discharge time duration corresponding to each of different discharge cut-off voltages; to sum the weighted continuous discharge time duration; to compare a summation result of the weighted continuous discharge time durations with the common multiple; and to perform a discharge protection on the battery in response to the summation result being larger than the common multiple. In response to the summation result being not larger than the common multiple, the control circuit 62 may continue to obtain the continuous discharge time duration of the battery being discharged at the discharge cut-off voltage until the summation result exceeds the common multiple and then the discharge protection can be performed on the battery.

Figure 7:
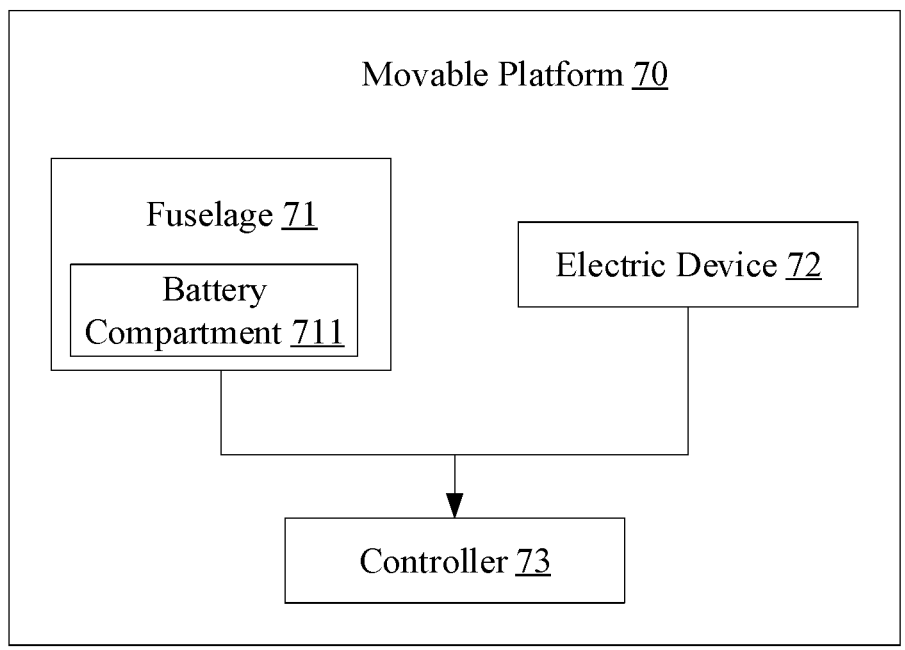
FIG. 7 is a block diagram of an exemplary movable platform consistent with various disclosed embodiments of the present disclosure.

The present disclosure provides a movable platform, such as a movable platform 70 shown in FIG. 7. The movable platform 70 includes, but is not limited to, an unmanned aerial vehicle (UAV), a ground remote control vehicle such as a ground remote control chariot, or a handheld gimbal. Referring to FIG. 7, the movable platform 70 is described by taking a UAV as an example. The UAV includes a fuselage 71, an electric device 72, and a controller 73.

The fuselage 71 includes a battery compartment 711 for accommodating a battery. The electric device 72 is used to provide power to cause the movable platform 70 to move. The controller 73 is electrically coupled to the electric device 72 and the battery in the battery compartment 711.

In some embodiments, the battery in the battery compartment 711 may provide electricity to the electric device 72 through the controller 73. The controller 73 may choose a corresponding discharge protection parameter according to a present status parameter of the battery to perform a discharge protection operation on the battery using the chosen discharge protection parameter, e.g., according to the chosen discharge protection parameter. Different status parameter ranges may correspond to different discharge protection parameters.

In some embodiments, the status parameter may include at least one of a discharge electrical current, a temperature, an internal resistance, the number of times of discharge, or SOH of a battery core of the battery.

In some embodiments, the discharge protection parameter may include at least one of a discharge cut-off voltage or a longest sustainable time duration for the battery being discharged at the discharge cut-off voltage. In some embodiments, the longest sustainable time duration may be inversely proportional to the discharge cut-off voltage.

In some embodiments, the controller 73 is further configured to obtain the continuous discharge time duration for the battery being discharged at the discharge cut-off voltage, and to accumulate the continuous discharge time durations of different discharge cut-off voltages within the discharge cycle of the battery, and to determine whether to perform a discharge protection operation according to the accumulated continuous discharge time duration. In some embodiments, the approach to accumulate the continuous discharge time durations of different discharge cut-off voltages may include that the controller 73 modifies the continuous discharge time duration corresponding to each of different discharge cut-off voltages by using a modification factor corresponding to the discharge cut-off voltage, where different discharge cut-off voltages correspond to different modification factors; and accumulates the modified continuous discharge time durations.

In some embodiments, the modification factor for a longest sustainable time duration corresponding to a discharge cut-off voltage may include a quotient of a common multiple of the longest sustainable time durations corresponding to different discharge cut-off voltages over the longest sustainable time duration corresponding to the discharge cut-off voltage. Correspondingly, the controller 73 may be further configured to calculate the common multiple of the longest sustainable time durations corresponding to different discharge cut-off voltages and the quotient; to use the quotient as a weight to weight continuous discharge time duration corresponding to each of different discharge cut-off voltages; to sum the weighted continuous discharge time durations; to compare a summation result of the weighted continuous discharge time durations with the common multiple; and to perform discharge protection on the battery in response to the summation result being larger than the common multiple. In response to summation result being not larger than the common multiple, the controller 73 may continue to obtain the continuous discharge time duration of the battery being discharged at the discharge cut-off voltage until the summation result exceeds the common multiple and then the discharge protection can be performed on the battery.

The control system 50 of the battery, the smart battery 60, and the movable platform 70 of the battery of the disclosure are based on above-described battery control methods of the foregoing embodiments. Each structural element thereof performs some or all processes of the corresponding method and realize some or similar effects as the method, descriptions of which are not repeated here.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The above-described integrated units can be implemented in electronic hardware, or in a combination of computer software and electronic hardware.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for controlling a battery comprising:
   obtaining a present status parameter of the battery, the present status parameter including a discharge electrical current of the battery and a temperature of the battery; and
   determining a discharge protection parameter according to the present status parameter for using in a discharge protection operation on the battery, wherein the discharge protection parameter is configured to:
     remain constant in response to the discharge electrical current being greater than a preset electrical current threshold or the temperature of the battery being less than a preset temperature;
     change as the temperature of the battery changes in response to the discharge electrical current being less than the preset current threshold; and
     change as the discharge electrical current changes in response to the temperature of the battery being greater than the preset temperature.

2. The method according to claim 1, wherein the present status parameter further includes one or more of: an internal resistance of the battery, a number of times of discharge of the battery, and a state of health of a battery core of the battery.

3. The method according to claim 1, wherein the discharge protection parameter includes a discharge cut-off voltage.

4. The method according to claim 3, wherein:
   the discharge protection parameter further includes a longest sustainable time duration for the battery being discharged at the discharge cut-off voltage, and
   the longest sustainable time duration is inversely proportional to the discharge cut-off voltage.

5. The method according to claim 1,
   wherein:
     the present status parameter is one of one or more present status parameters of the battery, and the discharge protection parameter is one of one or more discharge protection parameters each corresponding to one of the one or more present status parameters; and
     each of the one or more discharge protection parameters includes a discharge cut-off voltages;
   the method further comprising:
     obtaining one or more continuous discharge time durations in a discharge cycle of the battery, each of the one or more continuous discharge time durations being a time duration during which the battery is discharged at the discharge cut-off voltage of one of the one or more discharge protection parameters;
     accumulating the one or more continuous discharge time durations to obtain an accumulated discharge time duration; and
     determining whether to perform the discharge protection operation according to the accumulated discharge time duration.

6. The method according to claim 5, wherein accumulating the one or more continuous discharge time durations includes:
   modifying the one or more continuous discharge time durations using one or more modification factors each corresponding to one of the one or more discharge cut-off voltages to obtain one or more modified continuous discharge time durations; and accumulating the one or more modified continuous discharge time durations to obtain the accumulated discharge time duration.

7. The method according to claim 6, wherein:
modifying the one or more continuous discharge time durations using the one or more modification factors includes, for each one continuous discharge time duration of the one or more continuous discharge time durations:
  calculating a common multiple of one or more longest sustainable time durations corresponding to the one or more discharge cut-off voltages and a quotient of the common multiple over the longest sustainable time duration corresponding to one of the one or more discharge cut-off voltages at which the battery is discharged during the one continuous discharge time duration; and
  weighting the one continuous discharge time duration using the quotient as a weight to obtain the modified continuous discharge time duration corresponding to the one continuous discharge time duration; and
accumulating the one or more modified continuous discharge time durations includes obtaining a summation result of the modified continuous discharge time durations.

8. The method according to claim 7, wherein determining whether to perform the discharge protection operation includes:
comparing the summation result with the common multiple; and
performing the discharge protection operation in response to the summation result being larger than the common multiple.

9. A system for controlling a battery, comprising a processor configured to:
obtain one or more present status parameters of the battery;
determine one or more discharge protection parameters according to the one or more present status parameters for using in a discharge protection operation on the battery, each discharge protection parameter corresponding to one of the one or more present status parameters, and each discharge protection parameter including a discharge cut-off voltage;
obtain one or more continuous discharge time durations in a discharge cycle of the battery, each of the one or more continuous discharge time durations being a time duration during which the battery is discharged at the discharge cut-off voltage of one of the one or more discharge protection parameters;
accumulate the one or more continuous discharge time durations to obtain an accumulated discharge time duration; and
determine whether to perform the discharge protection operation according to the accumulated discharge time duration.

10. The system according to claim 9, further comprising:
a detection apparatus coupled to the processor and configured to detect the one or more present status parameters of the battery and transmit the one or more present status parameters to the processor.

11. The system according to claim 9, wherein:
each present status parameter includes at least one of a discharge electrical current of the battery, a temperature of the battery, an internal resistance of the battery, a number of times of discharges of the battery, or a state of health of a battery core of the battery.

12. The system according to claim 9, wherein:
each discharge protection parameter includes at least one of a discharge cut-off voltage or a longest sustainable time duration for the battery being discharged at the discharge cut-off voltage; and
the longest sustainable time duration is inversely proportional to the discharge cut-off voltage.

13. The system according to claim 9, wherein the processor is further configured to:
modify the one or more continuous discharge time durations using one or more modification factors each corresponding to one of the one or more discharge cut-off voltages to obtain one or more modified continuous discharge time durations; and
accumulate the one or more modified continuous discharge time durations to obtain the accumulated discharge time duration.

14. The system according to claim 13, wherein the processor is further configured to:
calculate a common multiple of one or more longest sustainable time durations corresponding to the one or more discharge cut-off voltages and a quotient of the common multiple over the longest sustainable time duration corresponding to one of the one or more discharge cut-off voltages at which the battery is discharged during the one continuous discharge time duration; and
weight the one continuous discharge time duration using the quotient as a weight to obtain the modified continuous discharge time duration corresponding to the one continuous discharge time duration;
obtain a summation result of the modified continuous discharge time durations;
compare the summation result with the common multiple; and
perform the discharge protection operation in response to the summation result being larger than the common multiple.

15. A smart battery comprising:
a control circuit; and
one or more energy storage units electrically coupled to the control circuit and configured to provide electricity through the control circuit;
wherein the control circuit is configured to:
  determine a discharge protection parameter according to a present status parameter of the one or more energy storage units, wherein the present status parameter includes a discharge electrical current of the battery and a temperature of the battery, and the discharge protection parameter is configured to:
    remain constant in response to the discharge electrical current being greater than a preset electrical current threshold or the temperature of the battery being less than a preset temperature;
    change as the temperature of the battery changes in response to the discharge electrical current being less than the preset current threshold; and
    change as the discharge electrical current changes in response to the temperature of the battery being greater than the preset temperature; and
  perform a discharge protection operation on the one or more energy storage units according to the discharge protection parameter.

16. The smart battery according to claim 15, wherein one of the one or more energy storage units includes a battery core.

* * * * *